United States Patent [19]

Podgorski

[11] Patent Number: 5,420,685

[45] Date of Patent: May 30, 1995

[54] ELECTROSTATIC PATH LENGTH CONTROL TRANSDUCER

[75] Inventor: Theodore J. Podgorski, St. Paul, Minn.

[73] Assignee: Honeywell Inc., Minneapolis, Minn.

[21] Appl. No.: 992,683

[22] Filed: Dec. 18, 1992

[51] Int. Cl.[6] .............................................. G01C 19/66
[52] U.S. Cl. ...................................... 356/350; 372/107
[58] Field of Search ................... 356/350; 372/94, 107

[56] References Cited

U.S. PATENT DOCUMENTS

| | | | |
|---|---|---|---|
| 3,581,227 | 5/1971 | Podgorski | 356/350 |
| 4,410,276 | 10/1983 | Ljung et al. | 356/350 |
| 4,915,492 | 4/1990 | Toth | 356/350 |
| 5,148,076 | 9/1992 | Albers et al. | 356/350 |

Primary Examiner—Samuel A. Turner
Attorney, Agent, or Firm—Craig J. Lervick

[57] ABSTRACT

A path length control transducer assembly is created by utilizing an electrostatic drive to move a transducer. By placing a first electrically conductive plate to a driver, and placing a second electrically conductive plate on the movable element of a transducer, and then applying an electrical signal between these two electrically conductive plates, a force sufficient to move the movable element of the transducer is created. Placing an optical element or a mirror on the transducer movable element allows this transducer assembly to be used in a ring laser gyro for path length control.

17 Claims, 3 Drawing Sheets

ELECTROSTATIC PATH LENGTH CONTROL TRANSDUCER

BACKGROUND OF THE INVENTION

The present invention relates to electrostatic control elements. More specifically, the present invention relates to a mirror transducer for controlling the path length of a ring laser gyro.

Ring laser gyroscopes require some means of path length control. As is well known in the art path length control is used to maintain the high intensity resonant signal which propagates within the laser cavity. By maintaining the resonance of the laser at the peak of the gain curve, the performance of the ring laser gyroscope is vastly improved.

Path length control has been achieved by a number of transducer assemblies. Typically these transducer assemblies are driven by one or more piezoelectric elements. Examples of these piezoelectric transducer assemblies, as used in ring laser gyros, can be seen in U.S. Pat. No. 3,581,227 issued to Podgorski, U.S. Pat. No. 4,915,492 issued to Toth, and U.S. Pat. No. 5,148,076 issued to Albers, et al, all of which are assigned to the assignee of the present invention.

In a ring laser gyroscope a gas discharge laser is created within a polygonal closed loop path which in turn causes two counter propagating light beams to exist within this closed loop path. To improve gyro performance it is necessary to adjust the path length of the closed loop path to allow the optical signals within this closed loop path to resonate at a maximum intensity. Secondly, it is necessary to adjust the path length to account for undesired changes in path length. Expansion or contraction due to changes in temperature is one source of undesired path length change.

A wide variety of devices have been developed to accommodate this adjustment in laser path length. As illustrated in U.S. Pat. No. 3,581,227 issued to Podgorski, a transducer element can be used to adjust the position of a mirror within the laser gyro cavity. As shown in FIG. 1 and described in the Podgorski patent, path length control can be realized by a thermally stable transducer block having a cylindrical center post 5, an integral diaphragm 6 extending radially outward from the center post 5 and an annular outer member 4 which is also integral with the diaphragm 6. A mirror 7 is mounted on one end of the central post 5. The transducer is attached to the ring laser gyro block 40 in a gas tight manner. Positioned directly behind and axially aligned with the central post 5 is a stack of piezoelectric ceramic elements 1. The piezoelectric ceramic elements 1 are used to drive or move the mirror 7 causing adjustment of its position. Mounted behind the stack of piezoelectric ceramic elements 1 is a rigid backing 2. This backing 2 must provide support when the piezoelectric elements expand, thus directing all of their force towards the transducer central post 5. This backing 2 requires fairly rigid epoxy bond and a fairly rigid element to provide the necessary support.

All of the previously mentioned transducers utilize and expand on the principals illustrated in the '227 patent. One particular elaboration is the creation of a dual diaphragm transducer element wherein the central post is connected to the annular outer member by two thin film diaphragm elements. Again, the diaphragm elements are integral with and extend radially outward from the cylindrical center post element. As with the Podgorski transducer, these double diaphragm transducer elements utilize piezoelectric elements to create the force necessary to cause movement of the cylindrical center post.

Ring laser gyroscopes are required to operate over a wide range of temperatures. Because of this temperature requirement thermal expansion and contraction can create many problems including the previously mention changes in laser path length. One purpose of the path length control transducer (PLC transducer) is to adjust the laser path length for these expansions and contractions.

The transducers of the prior art have a limited range of movement. Therefore, complex mode reset circuitry is necessary to maintain the transducer within its operating range. Mode reset involve moving the transducer mirror from one resonant peak to another. Since these mode resets detrimentally affect the performance of the gyro, it is desired that the number of mode resets be reduced. Thermal expansion is a source of mode resets, therefore it is desired that thermal expansion be controlled as much as possible, thus reducing the number of mode resets.

Numerous methods have been attempted to control the thermal expansion of the transducer element. One example of such method is the Albers et al. patent which discloses the use of both electrodes and piezoelectric ceramic to provide a means for moving the transducer mirror. However, it is still difficult to control the thermal expansion characteristics of piezoelectric ceramics.

SUMMARY OF THE INVENTION

It is an object of the present invention to provide a path length control transducer for use in a ring laser gyroscope which considerably reduces the thermal problems associated with such transducers. The transducer of the present invention will be more thermally stable thus reducing the frequency of mode resets within the ring laser gyro.

It is another object of the present invention to provide a path length control transducer which does not utilize piezoelectric ceramics as the driving elements. The elimination of the piezoelectric ceramics will help to control the thermal characteristics of the transducer.

Lastly, it is another object of the present invention to provide a transducer having few parts and a very simple design. By reducing the complexity of the transducer many of the problems related to thermal effects are eliminated.

The PLC transducer of the present invention provides for adjustment and repositioning of a single RLG mirror using an electrostatic drive. The transducer has a drive portion and a transducer portion to provide a path length controller. The transducer has a substantially cylindrical inner post having a first end and a second end. Attached to a first end of the center post is a mirror which is used for reflecting light beams within the ring laser cavity. Integral with the center post and extending radially outward are a first diaphragm and a second diaphragm. First diaphragm and second diaphragm are made up of thin layers of material created by cutting away a portion of the transducer block. Attached to an outer portion of the first and second diaphragm is an annular member. The annular member has a substantially cylindrical inner surface and a substantially cylindrical outer surface. The inner surface is integral with and connected to the first and the second diaphragms. The annular member has a mounting surface for connection to a ring laser gyro block. This annular mounting surface is parallel with and situated on the same end as the first end of center post. Attached to the second end of center post and opposite the mirror is an electrical conductor. This electrical conductor has a conducting path extending outward to the periphery of the annular member. Attached to a second end of the annular member is a driver for causing motion of the transducer center post. The driver is a substantially cylindrical plate having a first planar surface and a second planar surface wherein the first planar surface has a void therein. In one embodiment of the present invention the void in driver means is a spherical bore or spherical void. Attached to the driver and within the driver void is a second electrical conductor. This second electrical conductor is aligned to be facing and substantially parallel with the first electrical conductor. Again, an electrical conducting path extends from second electrical conductor to the periphery of the driver.

To operate the PLC transducer of the present invention an electrical signal is applied between the first electrical contact and the second electrical contact. The electrical signal causes first electrical conductor and second electrical conductor to be maintained at different electrical potentials. This difference in electrical potential causes attraction between first electrical conductor and second electrical conductor thus creating a force there between. This force causes movement of the center post thus causing the transducer mirror to be moved.

All of the parts of the present invention can be made out of single material with the exception of the electrical contacts and the mirror. Thus the material used can be chosen to match the thermal characteristics of the laser block itself. By matching such materials, the thermal characteristics of the path length control transducer will very closely match that of the laser block which can reduce the effects of thermal expansion and contraction.

BRIEF DESCRIPTION OF THE DRAWINGS

Further objects and advantages of the present invention can be seen by reading the following detailed description of the invention in conjunction with the drawings in which.

DETAILED DESCRIPTION OF THE INVENTION

Figure 1:
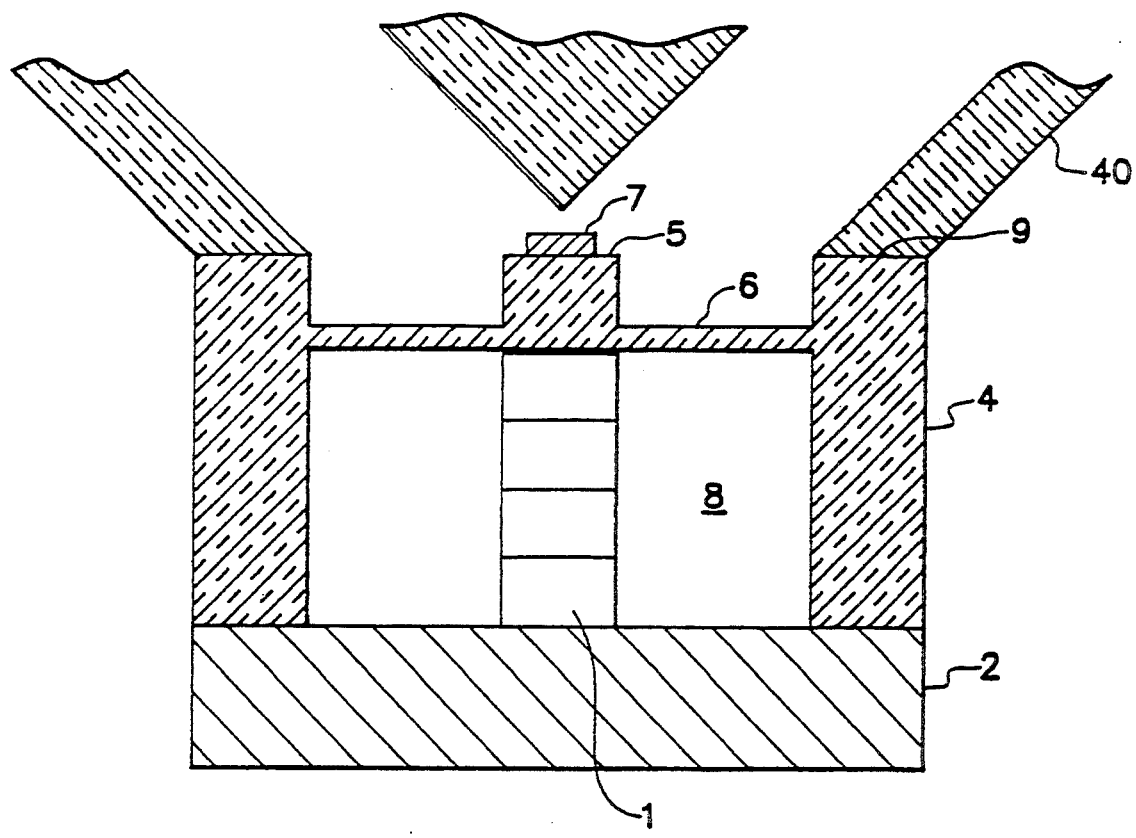
FIG. 1 illustrates a prior art PLC transducer using piezoelectric ceramic elements.
Figure 2:
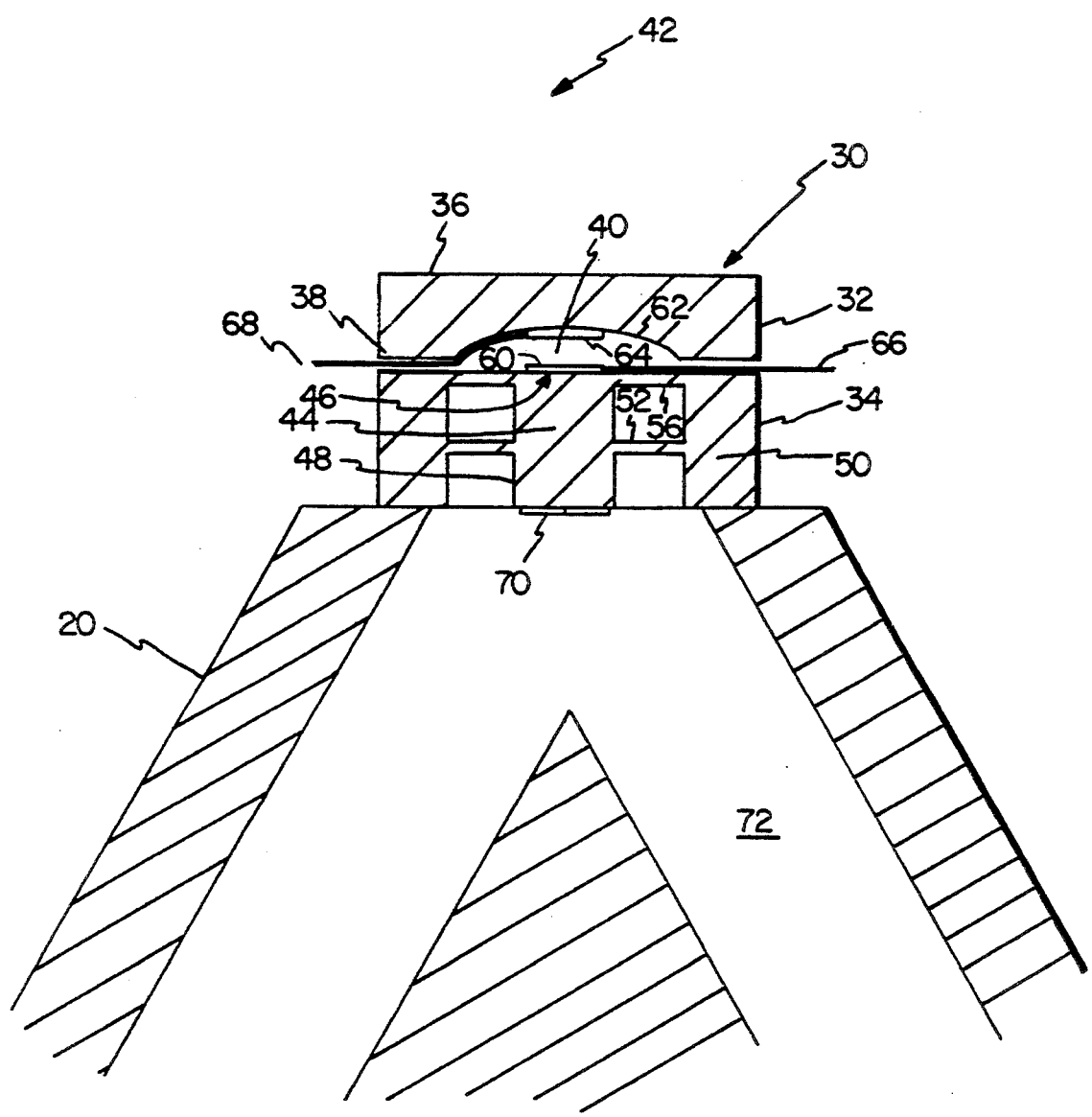
FIG. 2 is a detailed drawing of a PLC transducer using the principles of the present invention.

Referring now to FIG. 2 there is shown a path length control transducer assembly 30 which operates in accord with the principles of the present invention. The transducer assembly 30 is attached to a laser gyro block 20 at one of the corners. As is well known in the art, laser gyro block 20 supports a gas discharge laser which causes two optical signals to counter propagate within a closed loop path. The path length control transducer assembly 30 is used to adjust the position of corner mirror 70 within the laser cavity 72, thus, altering the dimensions of laser cavity 72 itself. Adjustments to the path length of laser cavity 72 is done for two purposes.

A first purpose is to adjust the path length to account for changes to elements due to thermal expansion. Secondly, adjustment of laser cavity path length is necessary to maintain maximum light intensity. The path length within the laser cavity 72 is adjusted to assure the optical signals resonate at an optimum frequency thereby providing high intensity output signals to the sensors.

PLC transducer assembly 30 is made up of driver 32 and a transducer 34. Driver 32 is cylindrical member having a first planar surface 36 and a second planar surface 38. First planar surface 36 and second planar surface 38 are parallel to and opposite one another. Driver 32 also contains a void 40 therein which extends inwardly from second planar surface 38. In the preferred embodiment void 40 is a spherical bore cut into driver 32. As previously mentioned driver 32 is a substantially cylindrical element, which has a central reference axis 42. Driver assembly 32 is symmetrical about reference axis 42.

Attached to driver 32 at driver second planar surface 38 is transducer 34. Transducer 34 has a center post 44 which has a first end 46 and a second end 48. Reference axis 42 intersects post first end 46 and post second end to 48 and is also aligned with center post 44. Transducer 34 also has an annular outer member 50. Annular outer member 50 is of a substantially cylindrical annular configuration having its cylindrical axis aligned with reference axis 42. Disposed between center post 44 and annular outer member 50 are a first diaphragm 52 and a second diaphragm 56. First diaphragm 52 and second diaphragm 56 are integral with both center post 44 and annular outer member 50. Annular outer member 56 is attached to driver 32 at one end and laser block 20 at another end.

Attached to first end 46 of center post 44 is a first electrically conductive metal film or post conductive film 60. Post conductive film 60 is a small portion of metallic material attached to the surface of post first end 46. Extending from electrical conductor 60 is a conductor path 66 which allows for conductive film 60 to be connected to a source of electrical potential.

When driver 32 is attached to transducer 34, driver void 40 provides a gap between transducer 34 and driver 32. Within void 40 and on an inner surface 62 is a second electrically conductive metal film or driver conductive film 64. Driver conductive film 64 is a portion of metallic material attached to surface 62. Driver conductive film 64 and post conductive film 60 are both positioned such that they are intersected by reference axis 42. Again a second conductor path 68 is run to the periphery of transducer assembly 30 so that an electrical signal can be applied to driver conductive film 64. By connecting a source of electrical potential between conductor path 66 and second conductor path 68, an electric potential is established between post conductive film 60 and driver conductive film 64.

On second end 48 of center post 44 is attached a transducer assembly mirror 70. Transducer assembly 30 is attached to RLG block 20 such that transducer assembly mirror 70 is positioned within laser block cavity 72 to allow reflection of the counter propagating optical signals.

In operation an electrical potential is applied between post conductive film 60 and driver conductive film 64 causing a attractive force between these two elements to be generated. This attractive force can cause movement of central post 44 depending upon the strength of the electrical signals. When a sufficient force is generated central post 44 moves in a translational fashion along reference axis 42. Consequently, transducer assembly mirror 70 is also moved or repositioned along reference axis 42. This motion allow for movement to mirror 70 while still maintaining its angle of orientation in relation to the counter propagating optical signal (e.g., transducer assembly mirror 70 translates along reference axis 42 while maintaining its perpendicularity to reference axis 42.)

Within void 40 is a small gap between post conductive film 60 and driver conductive film 64. In order to produce the required movement of post 44, fairly large voltage signals must be applied between the two conductive films 60 & 64. Due to their closeness, the possibility of arcing between the two conductive films 60 & 64 exists. To reduce the possibility of arcing, void 40 can either be evacuated, or filled with a high breakdown gas. An example of a gas is sulfur hexafluoride.

In the preferred embodiment transducer assembly 30 is made of a material which matches laser block 20. While many materials could be used, Zerodur is an example of an advantageous material. Because the same materials are used for transducer assembly 30 and laser block 20 the coefficients of thermal expansion very closely match one another, thus creating a uniform characteristic of thermal expansion. This monolithic design is very beneficial to the operation of the gyro as it operates over its wide range of temperatures.

By maintaining an electrical potential between post conductive film 60 and driver conductive film 64 attractive forces always exist between these two elements. Furthermore, an attractive force between driver 32 and transducer 34 also exist, thus causing a positive optical bond to be created there between. Electric conductor paths 66 and 68 are very thin layers of material and such will not interfere with the optical bond between driver 32 and transducer 34.

Figure 3:
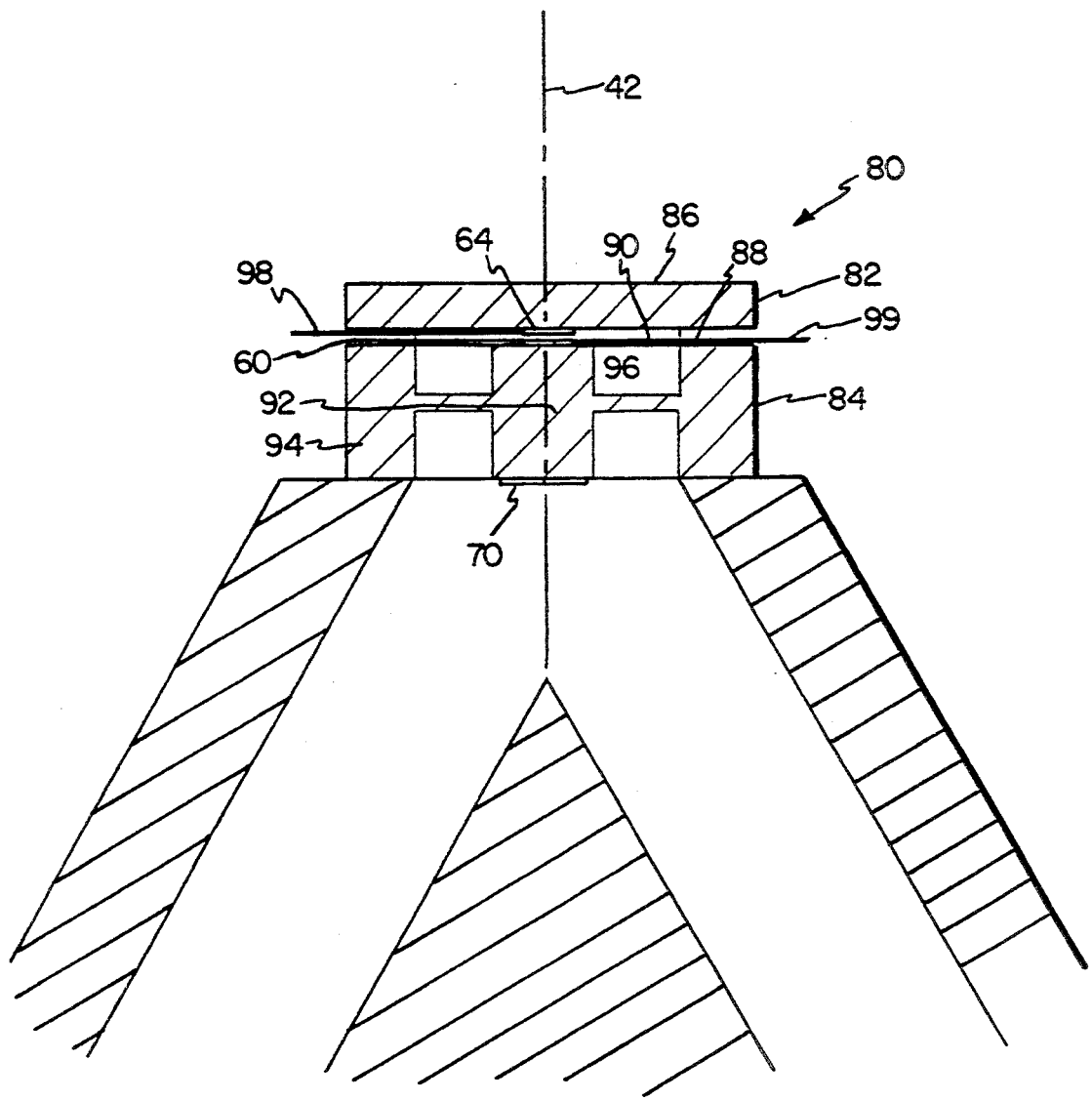
FIG. 3 is an alternate embodiment transducer which also utilizes the principles of the present invention.

Referring now to FIG. 3 there is shown an alternative embodiment of the present invention wherein like elements maintain like reference numbers. This transducer assembly 80 also has a driver 82 and a transducer 84. Driver 82 is again a cylindrical member having an upper surface 86 and a lower surface 88. Beginning at second surface 88 and extending inwardly is a transducer void 90. Again, driver assembly 82 is symmetrical with respect to central axis 42.

Those skilled in the art will recognize that driver 82 could be fabricated in a number of ways. In the present embodiment the conductor path is first deposited on driver. Then an outer rim is built up on the periphery of driver 82. This method of fabrication will create void 90 while also providing the necessary conductor path and mounting surfaces. Alternatively, void 90 could be machined into driver 82.

Transducer 84 has central post member 92 and an annular outer ring 94. Integral with both center post 92 and annular ring 94 and extending radially there between is diaphragm 96. Transducer 84 is also symmetrical about reference axis 42. Attached to first post end 46 is a first electrically conductive film 60. Attached to driver 82 at an inner surface within void 90 is a second electrically conductive film 64. As in the first embodiment, an electrical potential is maintained between first conductive film 60 and second conductive film 64. This electrical potential is created by the connection of an electrical source to a pair of conductor paths 98, 99 extending to the periphery of the transducer assembly 80. The difference in electrical potential causes attractive forces between driver 82 and central post 92, consequently resulting in translational motion of center post 92. This translation motion of center post 92 results in a similar translational motion of transducer assembly mirror 70. In this alternate embodiment a single diaphragm 96 is used in the transducer and the driver is of a slightly different structure.

Having described the present invention in considerable detail illustrating both a preferred embodiment and a second embodiment it should be apparent to those skilled in the art that the invention can be modified in arrangement and detail without departing from the principles of the invention. We claim all modifications coming within the scope and spirit of the following claims:

What is claimed is:

1. An optical transducer for use in a ring laser gyroscope, comprising:
    a driver means for structurally supporting an electromagnetic force, the driver means having a bottom surface with a void therein;
    a first conductor attached to the driver means and situated within the driver void, the first conductor for supporting a first electrical potential;
    a transducer means having a translatable inner portion and an outer portion wherein the inner portion is connected to the outer portion via a diaphragm portion, the transducer means for facilitating the translation of the inner portion, the transducer means outer portion attached to the driver means such that the inner portion is aligned with the driver void, the transducer inner portion not being attached to the driver means; and
    a second conductor attached to the transducer inner portion and substantially parallel to the first conductor, the second conductor for supporting a second electrical potential, wherein the first electrical potential interacts with the second electrical potential to create an electromagnetic force between the first conductor and the second conductor thus causing the transducer inner member to be translated with respect to the driver means.

2. The optical transducer of claim 1 wherein the transducer means outer portion is an annular member.

3. The optical transducer of claim 2 wherein the transducer means inner portion is a cylindrical member having a central axis aligned with the transducer outer portion annular axis.

4. The optical transducer of claim 1 further comprising a mirror attached to the transducer means inner portion, positioned opposite the second conductor, the mirror for reflecting optical signals which intersect therewith.

5. The optical transducer of claim 1 wherein the driver means indentation is a circular counterbore extending into the driver means.

6. The optical transducer of claim 1 wherein the driver means is a cylindrical member having a cylindrical axis and having the bottom surface normal to the cylindrical axis.

7. The optical transducer of claim 1 further comprising a first electrical contact attached to the driver means extending from the first conductor to the periphery of the driver means.

8. The optical transducer of claim 1 further comprising a second electrical contact attached to the transducer means extending from the second conductor to the periphery of the transducer means.

9. The optical transducer of claim 1 wherein the driver means and the transducer means are attached to one another by an optical bond.

10. A ring laser gyroscope for sensing rotational motion, comprising:
 a gyro block for supporting two counter propagating optical signals within a closed loop cavity;
 a transducer assembly attached to the gyro block at a corner thereof for adjusting the path length of the closed loop cavity, the transducer assembly having a transducer means and a driver means, the transducer means for supporting a mirror and moving the mirror in a translational manner, the mirror situated so as to face the interior of the closed loop cavity and to reflect the counter propagating optical signals, the transducer means having a central post member, an annular outer member, and a diaphragm connected integrally and radially between the central post member and the annular outer member, the central post member having the mirror attached to a first end thereof and an electrically conductive plate attached to a second end thereof, the driver assembly having a planar surface with a void therein, the driver planar surface attached to the transducer annular member such that the driver void is aligned with the transducer central post member, the driver having an electrically conductive plate attached to the driver void, whereby an electrical potential is applied between the driver electrically conductive plate and the transducer electrically conductive plate causing a force to be generated there between resulting in movement of the central post member.

11. The ring laser gyro of claim 10 wherein the central post member is cylindrical in shape having the first end and the second end normal to the cylindrical axis.

12. The ring laser gyro of claim 10 further comprising a second diaphragm integral with and extending radially between the central post member and the radially outer member.

13. The ring laser gyro of claim 10 wherein the driver void is a spherical absence of material filled with a high voltage breakdown gas.

14. A path length control transducer for controlling the optical path length of a resonant cavity, comprising:
 a block supporting the resonant cavity therein with an opening in the surface of the block which opens up to the cavity
 a driver member for supporting a force, the driver member having a planar surface with a void therein;
 a first electrically conducting plate attached to the driver member and positioned within the void in driver member planar surface;
 a transducer member having a central portion, an outer portion, a first diaphragm, and a second diaphragm, the central portion being a post like member having a first end and a second end, the outer portion being an annular member surrounding the central portion, the first diaphragm being integral with both the inner portion and the outer portion and extending radially there between, and the second diaphragm being integral with the inner portion and the outer portion and extending radially there between, the transducer member being attached to the driver member such that the outer portion is attached to the driver member planar surface and the driver void is disposed above the transducer member inner portion, the transducer outer member attached to the block and the transducer member covers the hole in the block surface;
 a second electrically conducting plate attached to transducer inner portion first end and situated substantially parallel to the first electrically conducting plate, wherein an electrical potential is applied between the first electrically conductive plate and the second electrically conductive plate causing a force to be generated there between resulting in the movement of the transducer inner portion; and
 a mirror attached to transducer member second end such that the mirror is positioned within the resonant cavity and moves along with the transducer inner portion.

15. The path length control transducer of claim 14 wherein the inner member is a cylindrical post member.

16. The path length control transducer of claim 14 wherein the driver void is a spherical absence of material.

17. The path length control transducer of claim 14 wherein the driver member and the transducer member are attached to one another by an optical bond.

* * * * *